United States Patent [19]

Chope

[11] 3,855,467

[45] Dec. 17, 1974

[54] SYSTEM FOR EFFECTIVELY ENLARGING A DETECTOR WINDOW

[75] Inventor: Henry Roy Chope, Columbus, Ohio

[73] Assignee: Industrial Nucleonics Corporation, Columbus, Ohio

[22] Filed: Apr. 11, 1968

[21] Appl. No.: 720,688

[52] U.S. Cl.......... 250/572, 210/222 R, 340/179.1, 328/58, 328/360
[51] Int. Cl. ............................................. G01b 7/06
[58] Field of Search...... 356/161; 250/319 TH, 214, 250/219 I, 83.3 D, 222 R, 222; 340/174.1; 328/58; 179/100.2

[56] References Cited
UNITED STATES PATENTS

| | | | |
|---|---|---|---|
| 2,932,280 | 5/1960 | Gilman | 250/83.3 |
| 3,059,119 | 10/1962 | Zenor | 250/219 |
| 3,278,747 | 10/1966 | Ohmart | 250/83.3 |
| 3,378,676 | 4/1968 | Clement | 235/151.3 |
| 2,517,330 | 8/1950 | Marenholtz | 356/161 |
| 2,933,687 | 4/1960 | Woolfson et al. | 328/58 |
| 2,996,624 | 8/1961 | Mumma | 328/58 X |
| 3,099,748 | 7/1963 | Weiss | 250/203 |
| 3,444,330 | 5/1969 | Battle | 179/100.2 |

Primary Examiner—Walter Stolwein
Attorney, Agent, or Firm—William T. Fryer, III; Allan M. Lowe; C. Henry Peterson

[57] ABSTRACT

A specific detector for measuring a property of a moving material may have a small detecting area or aperture. The aperture area is effectively enlarged by a circuit including an integrator, a delay device, and a linear combining circuit. The delay period of the delay device is varied in response to the relative velocity of the material being measured and the detector.

25 Claims, 9 Drawing Figures

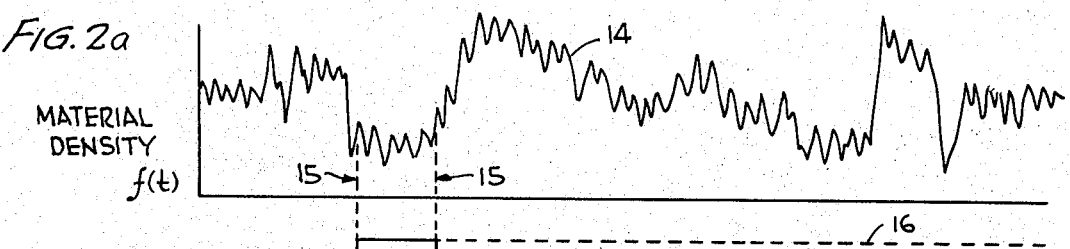
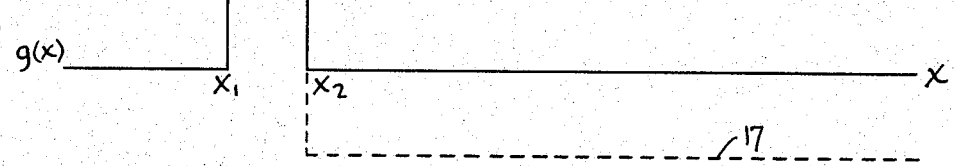
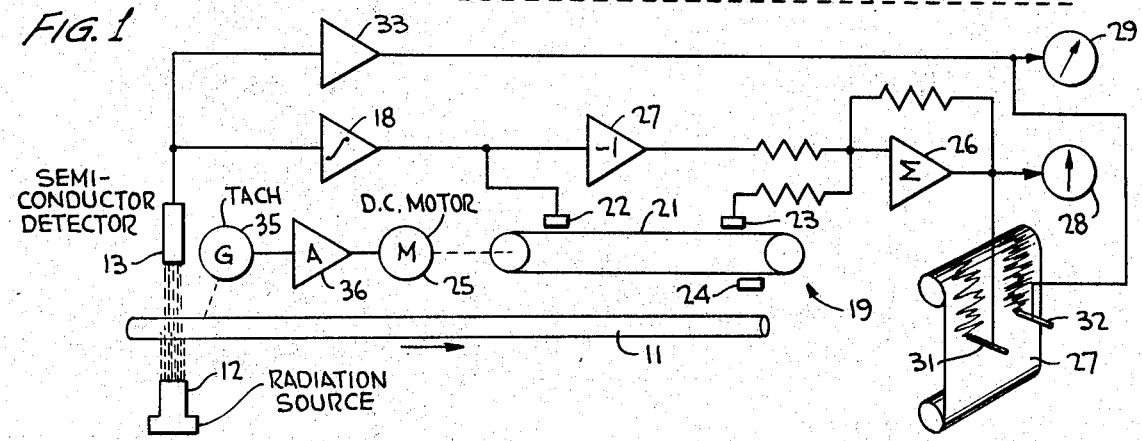
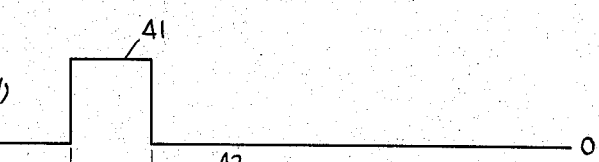
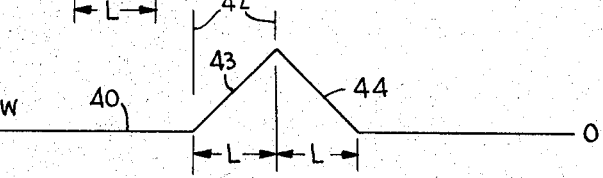
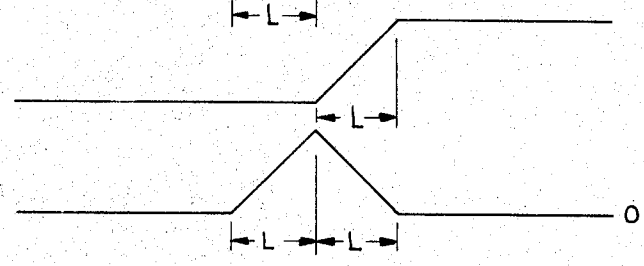

SYSTEM FOR EFFECTIVELY ENLARGING A DETECTOR WINDOW

The present invention relates generally to measuring and detecting systems and more particularly to a system including a detector having a window or aperture of relatively small area in combination with circuitry for effectively enlarging the aperture area.

Designers of detectors responsive, for example, to property variations of moving material or physical matter, generally seek a detector having a minimum area window or aperture. By providing a minimum area window, a detailed analysis of the fine structure of the material being analyzed is derived.

In many instances, however, the fine structure of a property includes considerable high frequency random variations that, in many instances, are similar to noise. Hence, if it is sought to provide an indication of the average property value of a relatively large area, without regard to the fine structure variations of the property, a detector having a narrow window cannot be utilized with conventional prior art techniques.

According to the present invention, the effective area of a detector having a small area window is enlarged with a circuit responsive to the fine structure indicating output of the detector. Thereby, the circuit output voltage is indicative of the average property value over a spatial area considerably in excess of the actual detector area. I have found that the circuit to achieve the result has the transfer function, G(s):

$$G(s) = 1/s \, (1 - e^{-sT}) \qquad 1$$

where:
 $s$ = the LaPlace operator,
 $e$ = the base of natural logarithms,
 $T$ = the time duration the material or matter is effectively within the enlarged window, $D/v$,
 $D$ = the length of the enlarged window, and
 $v$ = the relative velocity of the detector and material.

Expression (1) is synthesized with a circuit including an integrator responsive to a property detector having a small window area. In circuit with the integrator is a delay device having a delay period commensurate with the length of the effectively enlarged window aperture. According to another feature of the invention the delay period is varied in response to the velocity of the material or matter relative to the detector, whereby the effective length of the window aperture is constant regardless of the velocity between the material and detector.

It is, accordingly, an object of the present invention to provide a circuit for effectively enlarging the window aperture of a detector.

Another object of the invention is to provide a system wherein the output of a single physical matter property detector is transformed simultaneously to indications of the property value over both relatively small and large areas.

Another object of the present invention is to provide, in combination with a system for detecting the properties of physical matter moving relatively to a detector, a system for effectively enlarging the detector window area and maintaining the area relatively constant despite variations in the relative velocity between the matter and detector.

A further object of the invention is to provide a system for deriving indications of the average value of a property over a relatively large area in response to signals derived from a detector having a relatively small area.

The above and still further objects, features and advantages of the present invention will become apparent upon consideration of the following detailed description of one specific embodiment thereof, especially when taken in conjunction with the accompanying drawings, wherein:

FIG. 1 is a schematic diagram illustrating one embodiment of the present invention;

FIGS. 2a and 2b are respectively plots of (1) an exemplary function of time passing the detector of FIG. 1; and (2) the response of the detector of FIG. 1; and FIGS. 3a–3f are waveforms utilized to describe the operation of the system of FIG. 1.

The embodiment of the invention specifically disclosed concerns measuring the density of a cigarette rod in response to rod absorption of penetrating radiation. It is to be understood, however, that other materials and parameters or properties may be detected and analyzed in accordance with the invention. Further, the principles of the invention are not limited to detecting properties of material but may be utilized for analyzing the properties of any type of physical matter, for example, the voltage distribution of an electric field in a waveguide. In this connection, the term physical matter as utilized in the specification and claims refers to materials, electric fields, etc., susceptible to variations as functions of time and distance.

Reference is now made to FIG. 1 of the drawings wherein cigarette rod 11 is illustrated as travelling in one spatial dimension, along an X axis, between stationary semiconductor detector 13 which is responsive to penetrating radiation from source 12 as propagated through the rod. Radiation from source 12, which may be of the well-known type such as a beta ray source, is absorbed by rod 11 as a function of the rod density. Detector 13 includes well-known circuitry for deriving a D.C. output voltage directly proportional to the average density in the rod portion within the detector field of view or window. Detector 13 has a relatively small window or aperture in the direction of movement of rod 11, generally on the order of 6 millimeters, to enable detection of the fine structure density variations.

A plot of the D.C. output voltage of detector 13 indicating the density of cigarette rod 11 as a function of time, $f(x)$, is illustrated by waveform 14, FIG. 2a. Because the window of detector 13 has a narrow width, all of the fine structure density variations of rod 11, indicated by the high frequency changes of waveform 14, are reflected in corresponding fluctuations in the output voltage of detector 13. While the fine structure enables a very precise indication of the exact density of rod 11 to be ascertained at all positions along the length of the rod, it may have a deleterious effect on a control apparatus activated in response to the output of detector 13. In many instances, the fine structure also confuses an operator observing the output of detector 13 on, for example, a chart recorder. Hence, it is a primary object of the present invention to provide a system wherein the narrow window of detector 13 is enlarged to eliminate substantially the fine structure, high frequency variations of waveform 14.

In the one dimension system of FIG. 1, the effective length of the aperture or window of detector 13 along the length of rod 11 is enlarged along the rod longitudinal axis to a substantial length, indicated by the distance between dotted lines 15, FIG. 2a. A detector having a window indicated by the spread or separation between dotted lines 15 effectively averages the variations between the dotted lines to eliminate the high frequency components of waveform 14. While it might appear that the high frequency variations can be eliminated by a simple integration process of averaging the property values over a time interval commensurate with the desired length of the enlarged window, it has been found that this relatively simple solution to the problem does not provide a correct solution to the problem. The reason why a simple integrator circuit cannot be utilized for averaging the variations is described infra.

The output of a network capable of enlarging the window of waveform 14 to a separation indicated by the distance between lines 15 can be found in terms of the complex operator $s$ by transforming the variable time function of FIG. 2a into a LaPlace transform, $F(s)$, and then multiplying $F(s)$ by the LaPlace transform, $G(s)$, of the enlarged window. The enlarged window response as a function of displacement, $x$, is illustrated in FIG. 2b and may be expressed mathematically as:

$$g(x) = 1 \text{ for } x_1 \leq x \leq x_2 \quad (2)$$

as indicated by dashed lines 15, $g(x) = 0$ for all other values of $x$.

For any relative position of rod 11 and a large area detector, the detector output is the average value of the density of rod 11 encompassed by the window of the detector. This relationship is stated mathematically as:

$$\frac{1}{T}\int_{x_1}^{x_2} g(x)f(x)dx \quad (3)$$

where:

$T$ is the period the rod segment is within the detector field of view, $x$ is a position of rod 11 relative to detector 13 along the length of the rod, and $f(x)$ has the same shape as indicated by $f(t)$, FIG. 2a.

The transportation of $f(t)$ to $f(x)$ of the material density output of the detector is valid because at any instant of time a particular length of rod 11 is in the field of detector 13. To comprehend the reasoning behind Equation (3) more fully, consider the response of detector 13 if rod 11 and the detector are stationary relative to each other. Under these conditions, $g(x) = 0$ except for values of $x_1 \leq x \leq x_2$, when it equals 1, whereby Expression (3) is rewritten as:

$$\frac{1}{T}\int_{x_1}^{x_2} f(x)dx \quad (4)$$

For relative movement of rod 11 past detector 13 over a prolonged time interval, $t$, all values of $f(x)$ are integrated so the output of detector 13 is written as:

$$\frac{1}{T}\int_{\delta=0}^{\delta=t} g(\delta)f(t-\delta)d\delta \quad (5)$$

where:

$\delta$ is an auxiliary variable of integration related to time, $t$, in accordance with:

$$t = \int_0^t d\delta, \text{ and} \quad (6)$$

$T$ = the time period $f(t)$ is within the window defined by lines 15.

Expression (5) is recognized as a convolution of superposition integral indicating how the time varying function $f(t)$ indicative of material density sensed by detector 13 is modified by the weighting function $g(x)$, the area of the desired enlarged window. Taking the LaPlace transform of Expression (5) yields:

$$L\left[\frac{1}{T}\int_{\delta=0}^{\delta=t} g(\delta)f(t-\delta)d\delta\right] = L[g(t)] \cdot L[f(t)] \quad (7)$$

where:

L indicates that the function is to be operated on in accordance with a LaPlace transformation, and $g(t) = g(x)$ in the time domain.

The right side of Equation (7) is more familiarly written as:

$$G(s) \cdot F(s) \quad 8.$$

where:

$G(s)$ is the LaPlace transform of a function to synthesize the time domain characteristics of the window response, and $F(s)$ is the LaPlace transform of the material density, $F(t)$.

The solution of the problem now involves synthesizing $G(s)$ in terms of a circuit. The most straightforward manner for synthesizing $G(s)$ is to assume that: (1) $t = 0$ when the window leading edge occurs; and (2) $t = D/v$ when the trailing edge of the desired window aperture occurs, where $D$ = the length of the desired window and $v$ = the velocity of rod 11 relative to detector 13. Hence, in FIG. 2b, the times $t = 0$ and $t = D/v$ are illustrated by the positions $x_1$ and $x_2$, respectively.

The LaPlace transform of the window illustrated by FIG. 2b is derived by considering that a step of unity value occurs at $t = 0$ and subsists to infinity, indicated by horizontal line 16, and that at $t = D/v$ a negative step having unity value occurs and subsists until infinity, indicated by horizontal line 17. The LaPlace transforms of the positive and negative unit steps at $t = 0$ and $t = D/v$ are respectively $1/s$ and $-1/s \, e^{-sT}$. Combining the LaPlace transforms of the positive and negative steps yields:

$$G(s) = 1/s - e^{-sT}/s = 1/s\,(1 - e^{-sT}) \quad 9.$$

The $1/s$ term in Equation (9) is synthesized by an integrator, while the $e^{-sT}$ term is synthesized with a delay element having a delay period T. Hence, the circuit for synthesizing Equation (9) includes means for integrating the output of detector 13, delaying the integrator output and effectively subtracting the delayed signal with an undelayed replica of the integrator output.

Again considering FIG. 1, the apparatus for synthesizing Equation (9) comprises D.C. integrator 18, responsive to the D.C. density indicating outut signal of detector 13. The output signal of integrator 18 is applied to the input of variable delay element 19 comprised of endless loop magnetic recording tape 21, tape write-in head 22, tape readout head 23, and tape erase head 24. Write-in head 22 and readout head 23 are displaced from each other by a distance indicative of the desired effective window length for a nominal velocity, v, of rod 11 past detector 13. Tape 21 is driven by D.C. motor 25 in a direction whereby a signal portion recorded on the tape by head 22 is read by head 23 a period T seconds after originally being recorded.

The delayed output signal derived from head 23 is linearly combined in summing amplifier 26 with a polarity inverted replica of the undelayed output of integrator 18, as coupled to the summing amplifier by way of unity gain polarity inverting amplifier 27. Amplifier 26 responds to the delayed and undelayed outputs of integrator 18, as respectively coupled to it by head 23 and inverting amplifier 27, to derive an output signal indicative of the average value of the density of rod 11 for a window having a desired length D; typically the desired length is on the order of 3 to 4 inches. Hence, the effective window area of 6 millimeter semiconductor detector 13 is typically enlarged by a factor of approximately 15 by utilizing the present invention.

To provide a visual indication of the average density of rod 11 as detected by the effectively enlarged window, as well as the fine structure density, chart recorder 27 and d.c. voltmeters 28 and 29 are provided. Chart recorder 27 includes a pair of pens 31 and 32 respectively responsive to the output voltage of amplifier 26 and an exact replica of the output of detector 13, as coupled through amplifier 33, to provide permanent indications of the density properties of rod 11. Instantaneous indications of the average and fine structure density of rod 11 are respectively derived with meters 28 and 29.

A further feature of the invention is that the effective length of the enlarged window is maintained constant regardless of variations in the velocity between rod 11 and and detector 13. To this end, the delay time of tape 21, the time required for the tape to travel between heads 22 and 23, is changed in response to velocity variations of rod 11. Variations in the velocity of rod 11 passing beneath detector 13 are indicated with tachometer generator 35, having a rotor coupled to the transport mechanism (not shown) of rod 11. Thereby, generator 35 derives a varying amplitude D.C. output voltage directly proportional to the velocity of rod 11. The D.C. output voltage of tachometer generator 35 is coupled through power amplifier 36 to motor 25, whereby the motor shaft rotational velocity and the velocity of tape 21 are directly proportional to the longitudinal velocity of rod 11 as it passes detector 13. As rod longitudinal velocity, v, increases, the delay time of tape 21 between heads 22 and 23 decreases and the effectively enlarged window length remains constant.

To provide a more complete understanding as to the manner by which the present invention functions effectively to increase the area of window 13, consideration is now given to the waveforms of FIGS. 3a–3f. FIG. 3a is a plot of a theoretical variation of density of rod 11 as a function of length. The density function is assumed to have a zero value except for a distance indicated by positive rectangular wave 41. Wave 41 has a length L equal to the distance of a wide window, such as a window having an aperture of 4 inches along the travel direction of rod 11.

Initially, the response of a wide window of length L to the variation of FIG. 3a is considered. The wide window is defined by the distance between vertical lines 42 beneath the waveform of FIG. 3a. In the position illustrated by FIG. 3a, the finite value portion 41 of the rod density is not within the region covered by the window defined by vertical lines 42 and the detector output signal is zero, as indicated by wave segment 40, in FIG. 3b, a plot of the output signal of the detector defined by lines 42 as a function of time. As time progresses and the finite density portion of the waveform of FIG. 3a moves into the window defined by lines 42, a linear increase in the density viewed by the window occurs because increasingly larger portions of finite density portion 41 are being exposed to the window detector. In response to all of the finite density portion 41 being within the confines of the window defined by lines 42, a peak density value is within the detector field of view. Because the window has a rectangular response and finite variation 41 is considered to have a rectangular waveform, the density indication of the wide window is linear during the interval while segment 41 is moving into the detector field of view, as indicated by line 43. As time progresses further and lesser portions of finite density segment 41 are viewed by the window defined by lines 42, the density exposed to the window decreases linearly, as shown by line 44. The linear decrease continues until all of wave segment 41 is outside the window field of view, at which time the detector output returns to zero. The triangular waveform of FIG. 3b is the waveform expected to be derived by the relatively wide window defined by lines 42 since such a window inherently averages the density variations coupled thereto.

Consideration will now be given to the manner by which detector 13, having a relatively narrow window in the transport direction of rod 11, responds to finite density portion 41 as a function of time if the narrow width detector is positioned at the left one of lines 42. Because of the virtually infinitesimal width of the window of detector 13 relative to finite density portion 41, FIG. 3a, the time varying output of detector 13 is virtually a one-to-one replica of the density variations, as illustrated by the rectangular waveform of FIG. 3c. The output of detector 13 is coupled to integrator 18 which generates an output, FIG. 3d, comprising a linear segment 45 having duration L. Segment 45 respectively begins and ends as the leading and trailing edges of wave segment 41 pass detector 13. After the trailing edge of waveform 41 has completely passed detector 13, the output of integrator 18 remains at a finite value, illustrated by horizontal line 46. The output signal of integrator 18 is delayed in recorder 19 by an amount indicative of the desired window length, L. Thereby, the output signal of delay element 19, FIG. 3e, is an exact replica of the output of integrator 18, except that it lags the integrator output by the delay period L.

Summing amplifier 26 responds to the difference between the waveforms of FIGS. 3d and 3e to derive the triangular waveform of FIG. 3f. The leading and trailing edges of the triangle are respectively responsive to the output of integrator 18, FIG. 3d, and the inverted output of delay device 19, FIG. 3e. After a period commensurate with twice the window length the waveform of FIG. 3f has a zero value because the subtracted waveforms of FIGS. 3d and 3f are of equal amplitude.

It is noted that the waveform of FIG. 3f is identical with the waveform of FIG. 3b. Thereby, the output of summing amplifier 26 in response to the density variation of FIG. 3a is identical to the response which would be derived by a wide window having length L.

The waveform of FIG. 3d is believed clearly to show why integrating the output of detector 13 does not, by itself, effectively enlarge the detector window. In particular, the output voltage of integrator 18 remains constant, as indicated by line 46, after finite density segment 41 has propagated past detector 13. The constant finite value indicated by line 46 differs materially from the negative slope and zero value that a wide window, FIG. 3b, should derive over the period after all of finite segment 41 is within the detector field of view.

While I have described and illustrated one specific embodiment of my invention, it will be clear that variations of the details of construction which are specifically illustrated and described may be made without departing from the true spirit and scope of the invention as defined in the appended claims.

I claim:

1. A combination of apparatus utilizing only a single detector for a property of physical matter, said property varying as a function of time and displacement, said detector and matter being moved relative to each other as a function of time, said detector being responsive simultaneously to said property in different portions of said matter which are spaced from each other over a continuum having a limited displacement spread for deriving a signal indicative, at any time, of the value of the property over said limited displacement spread, and means for converting said signal to an output signal which is responsive simultaneously to variations in said property occurring in different portions of said matter which are spaced from each other over a continuum having a displacement spread larger than said limited displacement spread.

2. The combination of claim 1 further including means for maintaining the larger displacement spread constant despite variations in the relative velocity of said detector and matter.

3. The combination of claim 2 wherein said maintaining means includes means responsive to the relative velocity of said detector and matter.

4. The combination of claim 1 further including means for simultaneously indicating said detector-derived signal and said output signal indicative of the property over a larger displacement spread.

5. In combination, a detector for a property of physical matter, said property varying as a function of time and displacement, said detector and matter being moved relative to each other as a function of time, a window for said detector enabling said detector to be responsive at any time to only a portion of the matter, said window having an aperture, and means responsive to said detector for effectively but not actually enlarging the window aperture to provide an indication of the average value of the property over a larger portion of the matter than the portion covered by the window, said enlarging means having a transfer function in accordance with:

$1/s \, (1 - e^{-sT})$, where:

$s$ = the LaPlace operator, $e$ = the base of natural logarithms, $T$ = the time duration said matter is effectively within the enlarged window, $D/v$, $D$ = the length of the enlarged window, and $v$ = the relative velocity of the detector and matter.

6. The combination of claim 5 further including means for adjusting the value of T in response to the value of $v$.

7. The combination of claim 5 wherein said enlarging means includes an integrator for synthesizing $1/s$ and a delay means for synthesizing $e^{-sT}$.

8. The combination of claim 7 further including means for deriving a signal indicative of the value of $v$, and means for adjusting the delay period of the delay means in response to the signal indicative of $v$ so that T remains substantially constant.

9. The combination of claim 8 wherein said means for deriving a signal indicative of the value of $v$ includes means responsive to the relative velocity of said detector and matter.

10. A system for deriving an indication of a property of a material, said property varying as a function of time and displacement, comprising a detector for said property, said detector and material being moved relative to each other in at least one spatial direction, a window for said detector, said window having a relatively small aperture in said direction, and means responsive to said detector for effectively but not actually enlarging the aperture in said direction, said enlarging means having a transfer function in accordance with:

$1/s \, (1 - e^{-sT})$, where:

$s$ = the LaPlace operator, $e$ = the base of natural logarithms, $T$ = the time duration said material is effectively within the enlarged aperture, $D/v$, $D$ = the length of the enlarged aperture, and $v$ = relative velocity of the detector and matter.

11. The combination of claim 10 further including means for adjusting the value of T in response to the value of $v$.

12. The combination of claim 10 wherein said circuit means includes an integrator for synthesizing $1/s$ and a delay means for synthesizing $e^{-sT}$.

13. The combination of claim 12 further including means for deriving a signal indicative of the value of $v$, and means for adjusting the delay period of the delay means in response to the signal indicative of $v$ so that T remains substantially constant.

14. The combination of claim 13 wherein said means for deriving a signal indicative of the value of $v$ includes means responsive to the relative velocity of said detector and matter.

15. The combination of claim 1 including first indicator means responsive to said detector-derived signal for indicating the value of the property over said limited displacement spread, and second indicator means responsive to said output signal derived by said converting means for indicating the value of the property over said larger displacement spread.

16. A method of effectively enlarging the aperture of a detector deriving a response indicative of a property varying as a function of time and displacement comprising the steps of integrating the detector response to derive an undelayed integrated response, delaying the undelayed integrated response, and linearly combining the delayed integrated response with said undelayed integrated response.

17. The method of claim 16 further including the step of controlling the amount of the delay in response to the relative rate of displacement between the detector and property.

18. The combination of claim 1 wherein said means for deriving a signal indicative of the property over a larger displacement spread includes means responsive to the detector-derived signal for deriving an indication of the integral of the detector-derived signal, means for delaying the integral indication, and means for linearly combining the integral indication with an undelayed indication of the integral of the detector-derived signal.

19. The combination of claim 18 further including means for maintaining the larger displacement spread constant despite variations in the relative velocity of said detector and matter.

20. The combination of claim 19 wherein said maintaining means includes means responsive to the relative velocity of said detector and matter.

21. In combination, a detector for a property of physical matter, said property varying as a function of time and displacement, said detector and matter being moved relative to each other as a function of time, a window for said detector enabling said detector to be responsive at any time to only a portion of the matter, said window having an aperture, and means responsive to said detector for effectively but not actually enlarging the window aperture to provide an indication of the average value of the property over a larger portion of the matter than the portion covered by the window, said means for deriving a signal indicative of the property over a larger portion of the matter including means responsive to a response of the detector for driving an indication of the integral of the detector output signal, means for delaying the integral indication, and means for linearly combining the integral indication with an undelayed indication of the integral of the detector response.

22. The combination of claim 21 including means for maintaining the window portion spread constant despite variations in the relative velocity of said detector and matter.

23. The combination of claim 22 wherein said maintaining means includes means responsive to the relative velocity of said detector and matter.

24. A system for deriving an indication of a property of a material, said property varying as a function of time and displacement, comprising a detector for said property, said detector and material being moved relative to each other in at least one spatial direction, a window for said detector, said window having a relatively small aperture in said direction, and means responsive to said detector for effectively but not actually enlarging the aperture in said direction, said means for effectively enlarging the aperture including means responsive to an output signal of the detector for deriving an indication of the integral of the detector output signal, means for delaying the integral indication, and means for linearly combining the integral indication with an undelayed indication of the integral of the detector output signal.

25. The combination of claim 24 further including means for controlling the period of the delaying means in response to the relative velocity of the detector and material.

* * * * *